(12) United States Patent
Abney, Sr.

(10) Patent No.: US 7,913,704 B1
(45) Date of Patent: Mar. 29, 2011

(54) SYSTEMS AND METHODS FOR WASHING-OUT CONCRETE POURING EQUIPMENT

(75) Inventor: Ricki Joe Abney, Sr., Waller, TX (US)

(73) Assignee: Ricki Joe Abney, Sr., Waller, TX (US)

( * ) Notice: Subject to any disclaimer, the term of this patent is extended or adjusted under 35 U.S.C. 154(b) by 1055 days.

(21) Appl. No.: 11/484,283

(22) Filed: Jul. 11, 2006

(51) Int. Cl.
*B08B 3/00* (2006.01)

(52) U.S. Cl. .............. 134/184; 134/60; 134/61; 134/84; 134/109; 134/117

(58) Field of Classification Search .......................... None
See application file for complete search history.

(56) References Cited

U.S. PATENT DOCUMENTS

| | | | | |
|---|---|---|---|---|
| 5,127,740 A | * | 7/1992 | DeBoer | 366/2 |
| 5,460,431 A | * | 10/1995 | McWilliams | 298/22 AE |
| 5,685,978 A | * | 11/1997 | Petrick et al. | 210/241 |
| 5,695,280 A | * | 12/1997 | Baker et al. | 366/17 |
| 6,802,964 B2 | * | 10/2004 | Preisser et al. | 210/172.1 |
| 2004/0074903 A1 | * | 4/2004 | Klempner | 220/23.87 |
| 2004/0124190 A1 | * | 7/2004 | Beyer | 220/1.5 |

* cited by examiner

*Primary Examiner* — Michael Kornakov
*Assistant Examiner* — Eric Golightly
(74) *Attorney, Agent, or Firm* — Thompson & Knight LLP; James J. Murphy

(57) ABSTRACT

A system for washing-out concrete pouring equipment includes a bin for receiving waste materials washed with water from the concrete pouring equipment. The bin includes openings allowing liquid to drain into a base unit that includes sidewalls defining a receptacle for receiving the bin and a sloped bottom for conveying liquid drained from the bin to a sump. A filtering system filters particulate matter from liquid provided from the sump to recover the water.

8 Claims, 4 Drawing Sheets

US 7,913,704 B1

SYSTEMS AND METHODS FOR WASHING-OUT CONCRETE POURING EQUIPMENT

FIELD OF INVENTION

The present invention relates in general to the construction industry, and in particular, to systems and methods for washing-out concrete pouring equipment.

BACKGROUND OF INVENTION

Concrete is one of the primary building materials used worldwide. One common form of concrete used in construction is "ready-mix" concrete, which is produced in accordance with a given formula at a plant and then trucked to a jobsite. At the jobsite, the concrete is off-loaded from the truck, as required to form a desired structure. Any excess or residual concrete left in the truck is then typically washed-out at the jobsite.

One current wash-out practice is to dig a pit in the ground and line it with plastic film. Ready-mix trucks dump any excess concrete into the pit and use roughly 15-20 gallons of water to rinse the truck and chute. The typical concrete pump will dump approximately ¼ to ½ a cubic yard of concrete into the pit and then require 30-50 gallons of water for rinsing off the pump truck. The result is not only a significant amount of wasted water, but a significant amount of water contaminated with caustic concrete waste. Furthermore, washout pits normally remain uncovered and if it rains, the washout pit may overflow and cause further contamination of the soil around the pit. This overflow water can also run into storm drains and on into rivers and bays, and possibly even into the ground water.

Eventually, a small front-end loader or the like is used to break up the waste concrete in the washout pit and remove it to be crushed and recycled. During this process the plastic liner is ruined and any remaining concrete-contaminated wastewater leaks into the soil.

One known solution to the problem of waste concrete is to wash-out ready-mix trucks into roll-off trash dumpsters. However, these types of dumpsters are not watertight and much of the wastewater leaks out and soaks into the soil. Furthermore, concrete pump trucks cannot use these dumpsters and therefore must dump their extra concrete waste and the resulting wastewater onto the ground next to the dumpster. Moreover, dumpsters are also subject to rain contamination and overflow.

On some large road jobs, or at extra large commercial job sites, contractors will sometimes dig out a large washout pit (approximately % to 1 acre in size) and set up several large evaporation pits. This technique allows for the washout of trucks in one location followed by wastewater evaporation and periodic waste concrete removal from the evaporation pits. These washout pits are too large and too costly to build and maintain for use in the construction of new home communities or at small commercial job sites. Additionally, the problems of rain overflow and wasted water are not addressed by this technique.

Hence, new solutions are required for conserving water and minimizing environmental impact during the wash-out of concrete pouring equipment at jobsites.

SUMMARY OF INVENTION

The principles of the present invention are embodied in methods and systems for washing-out construction equipment, in particular concrete pouring equipment. According to one particular embodiment, a system is disclosed for washing-out concrete pouring equipment that includes a bin for receiving waste materials washed with water from the concrete pouring equipment. The bin includes openings allowing liquid to drain into a base unit that includes sidewalls defining a receptacle which receives the bin and has a sloped bottom for conveying liquid drained from the bin to a sump. A filtering system filters particulate matter from liquid provided from the sump to recover the water.

Embodiments of the present principles advantageously protect the environment from exposure to polluted waste water and allow for significant amounts of water to be recovered and recycled. Moreover, extracted waste concrete materials are quickly accumulated and removed, also for recycling. Furthermore, wash-out systems embodying these principles are scalable and therefore can be adapted to include as few as one wash-out station to five or more wash-out stations. Additionally, wash-out systems according to the inventive principles are easily transportable, inexpensive to maintain on the jobsite, and relatively easy to construct.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-3A of the drawings, in which like numbers designate like parts.

Figure 1A:
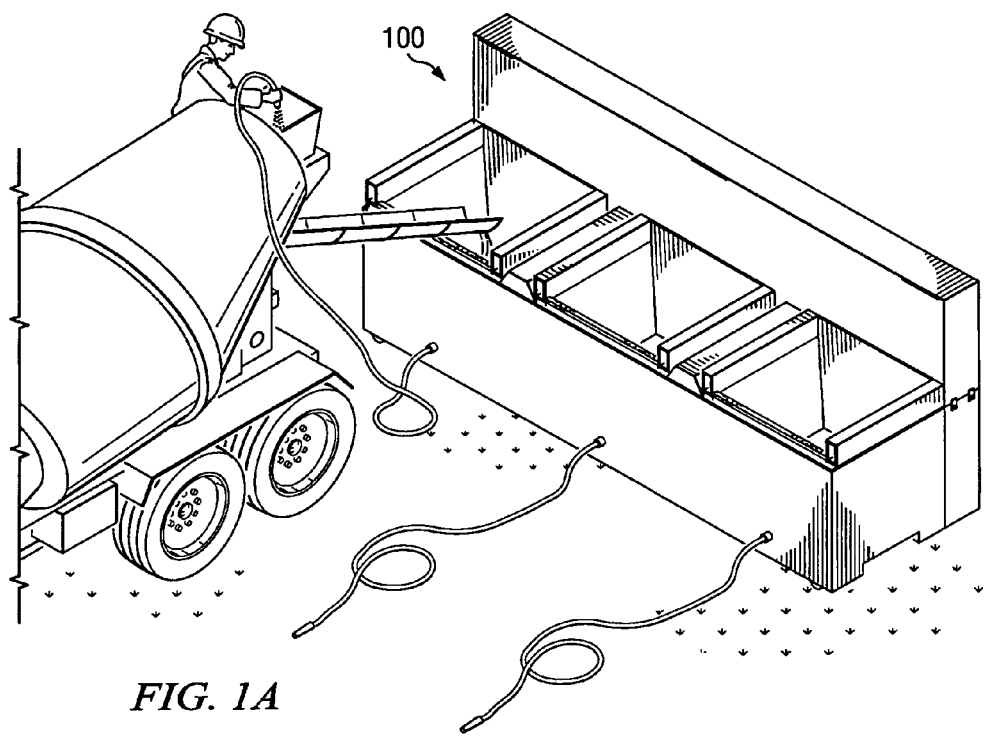
FIG. 1A is a conceptual diagram illustrating a representative wash-out system according to the principles of the present invention in a typical working environment.
Figure 1B:
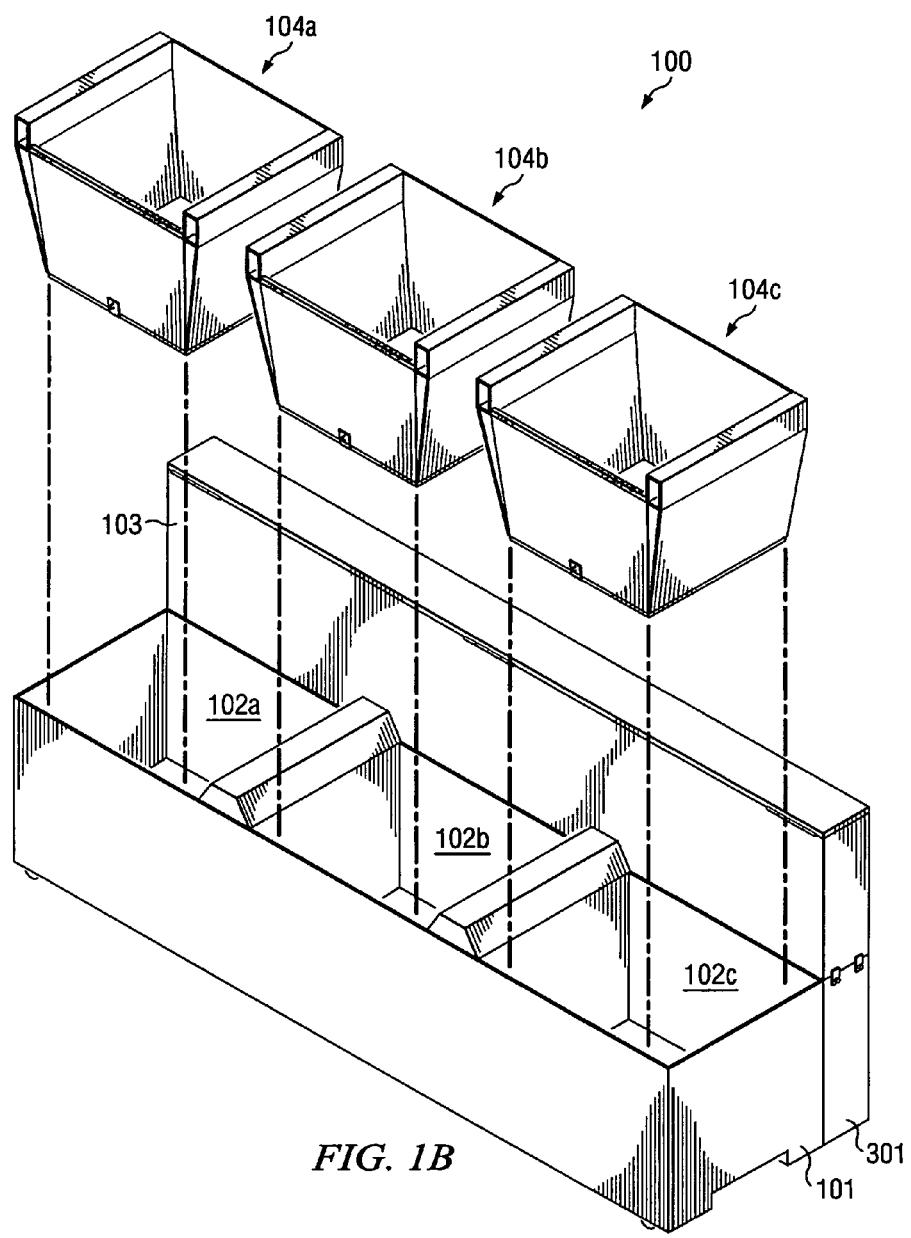
FIG. 1B is a diagram showing a perspective-exploded view of an exemplary three-bin wash-out system according to the principles of the present invention.

FIGS. 1A and 1B illustrate a wash-out system 100 according to the principles of the present invention. Advantageously, wash-out system allows for the chute of a concrete truck or the nozzle of a concrete pump to be rinsed out and the resulting waste-water mixture to be captured. The solids are then removed from the mixture and the water filtered and recycled for use in subsequent rinse out operation. Advantageously, the waste-waste mixture is never in contact with the ground, thereby minimizing environmental contamination. Furthermore, wash-out system 100 can easily be moved from jobsite to jobsite, thereby eliminating the need to dig environmentally hazardous wash-out pits.

The illustrated embodiment of wash-out system 100 shown in FIGS. 1A AND 1B includes three stations supporting the wash-out of three corresponding concrete trucks, such as the exemplary ready-mix concrete truck as shown in FIG. 1a. (While a ready-mix concrete truck is shown for purposes of discussion, the principles of the present invention are equally applicable to other types of concrete pouring equipment, such as concrete pumps.) Alternate embodiments of wash-out system 100 may have a smaller or greater number of wash-away stations, depending on the number of pieces concrete pouring equipment the user wishes to support at one time.

In the illustrated embodiment, wash-out system 100 includes a base portion 101, including three receptacles 102a-102c for receiving a corresponding bin 104a-104c. As discussed further below, wash-out system 100 includes a filter system 103, which filters particulate matter from the contaminated liquids that drain from each bin 104a-104c being used for wash-out. Each bin 104a-104c, which are discussed below in detail in conjunction with FIG. 2, can be removed from corresponding receptacles 102a-102c, such that waste materials captured within bins 104a-104c can be hauled away and, for example, crushed and recycled as road base. After filtering through filter system 103, the filtered water is stored in a clean water tank 301, discussed in detail below in conjunction with FIGS. 3A AND 3B, and recycled for use in washing-out concrete pouring equipment.

Preferably, base 101, filter system 103, and bins 104a-104c are constructed from steel plate, although alternate materials that will sustain the wear and tear typically found at a jobsite are equally acceptable.

Figure 2A:
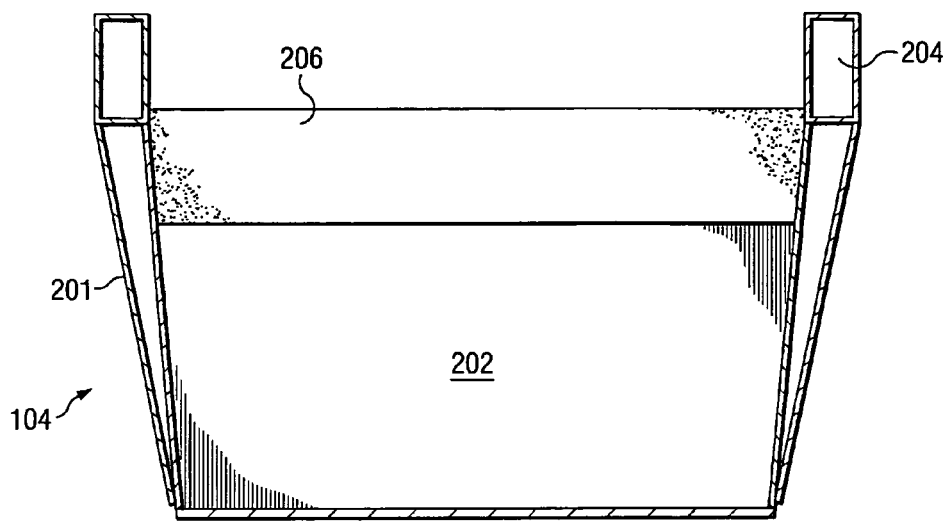
FIG. 2A is a diagram providing a cut-away end view of a selected one of the bins shown in FIG. 1B.
Figure 2B:
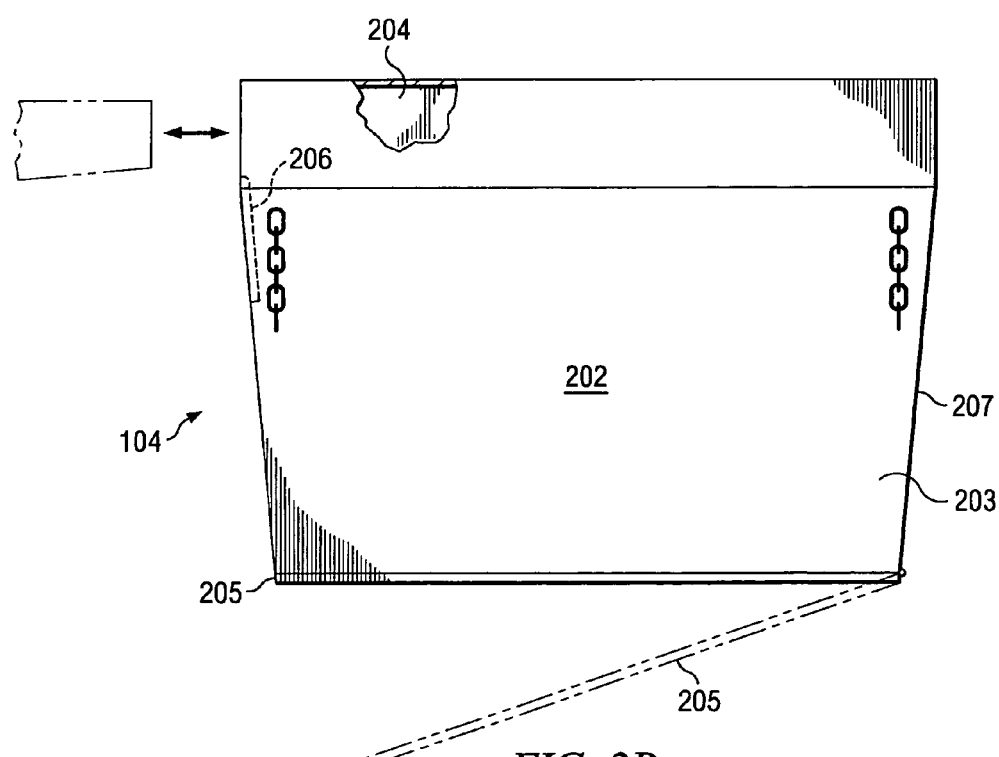
FIG. 2B is a diagram showing a side view of the bin of FIG. 2A.

FIG. 2A is a cutaway view of the selected one of bins 104a-104c shown in FIG. 1B. Bins 104a-104b include a steel frame 201 and sidewalls 203, which define a receptacle 202 for receiving mixture of water, rock, concrete, sand, and similar waste materials washed from the cement pouring equipment. Receptacles 204 provide for receiving a forklift fork or similar device for inserting and removing bins 104a-104c from the corresponding receptacles 102a-102c in base 101. Each bin 104a-104c also includes a hinged bottom 205, which allows accumulated material (e.g. rock, concrete and sand) to be dumped for recovery. Additionally, each bin 104a-104c includes a flexible portion 206, made of rubber or a similar material, upon which a concrete truck chute or concrete pump nozzle rests during wash-out.

Sidewalls 203 are fastened to frame 201 at various points, however, spaces or gaps are provided along the edges 207 where the sidewalls meet, such that water can seep out during the wash out process, while larger particulate matter remains within receptacle 202. Similarly, when hinged bottom 205 is in the closed position, spaces or gaps around its periphery similarly allow water and small particulate matter to seep out of bin 104a-104c, while larger particulate matter is retained.

Figure 3B:
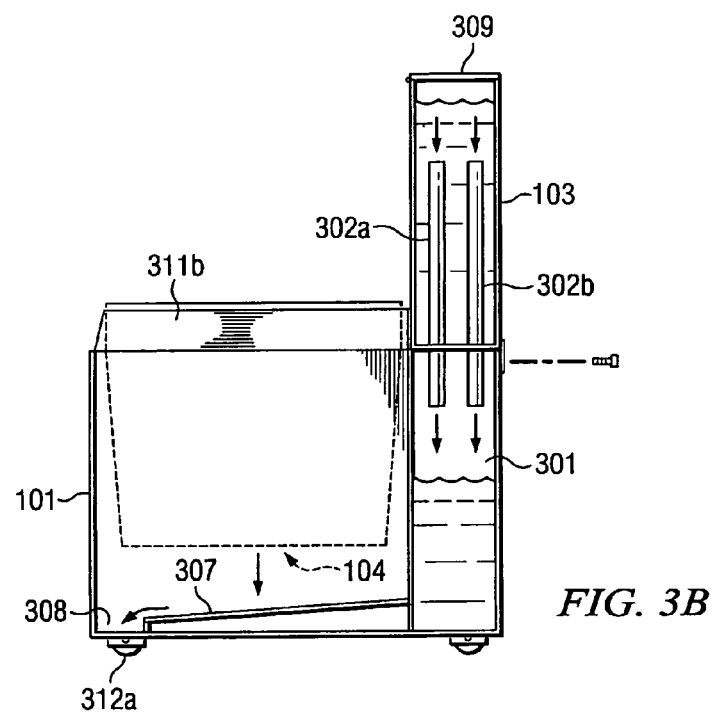
FIG. 3B is a diagram providing an and cut-away view of the base portion of the wash-out system of FIG. 1A.
Figure 3A:
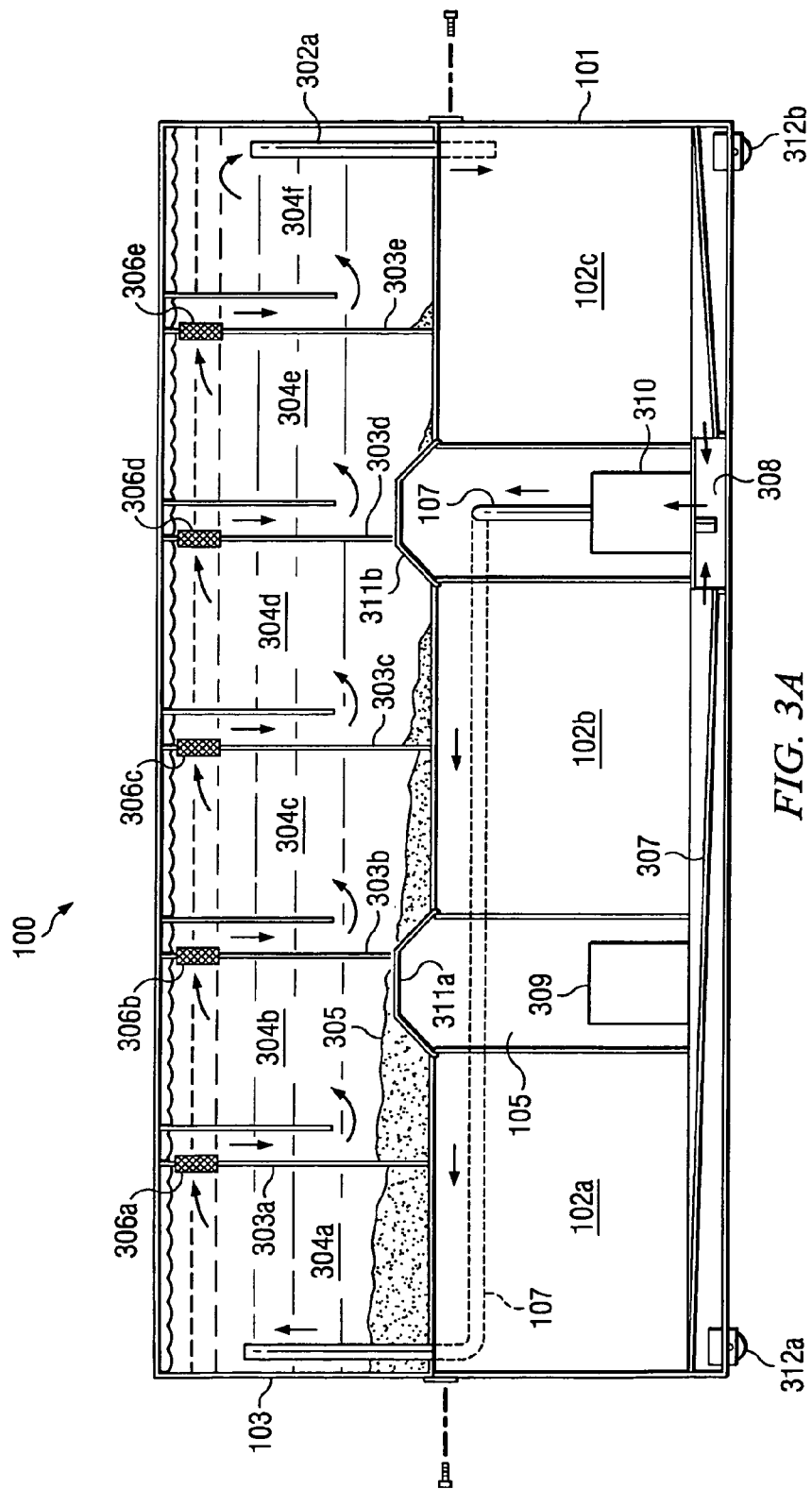
FIG. 3A is a diagram showing a side cut-away view of the base portion of the wash-out system shown in FIG. 1A.

FIG. 3A is a front cross-sectional view of base 101 and filter 103. FIG. 3B provides a corresponding cross-sectional and view. In particular, filter system 103 includes a set of baffles 303a-304f, which define a set of separation tanks 304a-304f. Water with particulate matter enters at first settlement tank 304a through pipe 107 and exits separation tank 304f through pipes 302a and 302b during the filtering operations described below. Each settlement tank 304a-304f is used to collect particulate matter 305, such as sand and concrete. Additional filters 306a-306e, for example broom filters or sponges, remove particles from the water-waste mixture cascading over baffles 303a-303e. Filter system 103 is bolted or fastened to base 101 and can therefore be removed for cleaning through cover 309.

The internal floors 307 of base 101 slope to a sump area 308. Base portion 101 also houses a clean water pump 309, for pumping water through a hose to a user, and a sump pump 310, each of which is respectively accessible through a removable cover 311a-311b. (While one clean water hose is shown in FIG. 1A as an example, clean water pump 309 can support multiple hoses for simultaneous wash-out of multiple pieces of concrete pouring equipment.) Wheels 312 allow wash-out system 100 to be easily moved around the jobsite.

During wash-out, for example wash-out of the chute of a ready-mix concrete truck, a worker rinses the chute, as shown in FIG. 1A, using clean water pumped from clean water tank 301 by clean water pump 309. The resulting mixture of water and waste concrete products are swept into the corresponding bin 104a-104c. The larger particulate matter, such as large pieces of concrete and rock, are retained within the given bin 104a-104c. The water and smaller particulate matter drains through the gaps along the edges of the bin sidewalls and bottom and into the corresponding receptacle 102a-102c.

Water and particulate matter draining into the corresponding receptacle 102a-102c flows down the sloped inner floors 307 of base 101 to sump 308. The water and small particulate matter accumulating in sump 308 are pumped by sump pump 310 through pipe 107 into first settlement tank 304a. At least some of the particulate matter 305 settles out to the bottom as settlement tank 304a fills. As the water and remaining particulate matter reach the top of settlement tank 304a, they cascade through filter 306a and into second settlement tank 304b, which begins to fill as additional particulate matter 305 settles to the bottom.

This process continues with the progressively cleaner water-waste mixture cascading through settlement tanks 304c-f and corresponding filters 306c-306e. At end settlement tank 304f, the remaining clean water flows through pipes 302a and 302b into underlying clean water tank 301, where it is available for recycling.

Advantageously, wash-out system 100 not only protects the environment from exposure to polluted waste water, it also allows significant amounts of water to be recycled. Moreover, removable bins 104a-104c allow the user to quickly and easily remove extracted waste concrete materials for recycling, for example as road bed. Furthermore, wash-out system 100 is scalable and therefore can be adapted to include as few as one wash-out station to five or more wash-out stations. Additionally, wash-out system 100 is easily transportable, inexpensive to maintain on the jobsite, and relatively easy to construct.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A wash-out system for washing concrete pouring equipment comprising:
   a base portion defining a set of receptacles each for receiving a removable bin and having a floor sloping to convey liquid drained from a bin received by a selected one of the receptacles to a sump area;
   a filter system including a plurality of pairs of settlement tanks separated by baffles defining a path allowing the liquid drained from the bin to cascade between the pairs of settlement tanks, wherein first and second ones of the settlement tanks of each pair of settlement tanks are separated by a first upward extending baffle providing a partial wall between the first and second ones of the settlement tanks and a second downward baffle spaced from the first baffle and extending into the second one of the settlement tanks;

a filtering pump for pumping the liquid drained from the bin from the sump area of the base portion to the first one of a first one of the pairs settlement tanks of the filter system such that the liquid cascades over the partial wall provided by the first baffle and downward through a space between the first and second baffles into the second one of the first pair of settlement tanks leaving behind waste material in the first and second ones of the settlement tanks of the first pair of settlement tanks;

a clean water tank for receiving and storing filtered water provided from another one of the settlement tanks; and a set of at least one bin removably received in a selected one of the receptacles of the base portion and for receiving wash-out waste material and having drain apertures allowing at least some of a liquid portion of the wash-out waste material, including particulate waste material smaller than the drain apertures, to drain into the selected one of the receptacles while retaining particulate waste material larger than the drain apertures within the bin.

2. The wash-out system of claim 1, wherein the filter system is removably attached to the base portion during wash-out operations.

3. The wash-out system of claim 1, wherein the filter system further comprises filters disposed in an aperture defined between a top of the partial wall defined by the first baffle of a corresponding pair of settlement tanks and a top wall of the filter system.

4. The wash-out system of claim 1, wherein the clean water tank is below the another one of the settlement tanks such that water is provided to the clean water tank under force of gravity.

5. The wash-out system of claim 1, further comprising a clean water pump for pumping clean water from the clean water tank for use in washing-out concrete pouring equipment.

6. The wash-out system of claim 1, wherein the at least one bin includes a flexible portion for supporting a portion of the concrete pouring equipment being washed-out.

7. The wash-out system of claim 1, wherein the bin includes at least one structure for receiving lifting equipment.

8. The wash-out system of claim 1, wherein the bin includes at least one hinged wall for dumping materials disposed within the bin.

* * * * *